(12) United States Patent
Kochaniak et al.

(10) Patent No.: US 10,410,130 B1
(45) Date of Patent: Sep. 10, 2019

(54) INFERRING RESIDENTIAL HOME CHARACTERISTICS BASED ON ENERGY DATA

(71) Applicant: OPOWER, INC., Arlington, VA (US)

(72) Inventors: Joanna Kochaniak, Needham, MA (US); Arhan Gunel, Alexandria, VA (US); Rajesh Nerlikar, Arlington, VA (US); Yoni Ben-Meshulam, Mountain View, CA (US); Jan Rubio, Arlington, VA (US); Anton Vattay, Herndon, VA (US); Randall Benjamin Siemon, Falls Church, VA (US); Erik Shilts, San Francisco, CA (US)

(73) Assignee: OPOWER, INC., Arlington, VA (US)

( * ) Notice: Subject to any disclaimer, the term of this patent is extended or adjusted under 35 U.S.C. 154(b) by 651 days.

(21) Appl. No.: 14/454,360

(22) Filed: Aug. 7, 2014

(51) Int. Cl.
*G06N 5/04* (2006.01)
*G06Q 50/06* (2012.01)

(52) U.S. Cl.
CPC ............. *G06N 5/048* (2013.01); *G06Q 50/06* (2013.01)

(58) Field of Classification Search
None
See application file for complete search history.

(56) References Cited

U.S. PATENT DOCUMENTS

| | | |
|---|---|---|
| 4,334,275 A | 6/1982 | Levine |
| 4,843,575 A | 6/1989 | Crane |
| 5,513,519 A | 5/1996 | Cauger et al. |
| 5,566,084 A | 10/1996 | Cmar |
| 5,717,609 A | 2/1998 | Packa et al. |
| 5,855,011 A | 12/1998 | Tatsuoka |
| 5,873,251 A | 2/1999 | Iino |
| 5,930,773 A | 7/1999 | Crooks et al. |
| 5,930,803 A | 7/1999 | Becker et al. |
| 5,948,303 A | 9/1999 | Larson |
| 6,035,285 A | 3/2000 | Schlect et al. |
| 6,088,688 A | 7/2000 | Crooks et al. |
| 6,295,504 B1 | 9/2001 | Ye et al. |

(Continued)

FOREIGN PATENT DOCUMENTS

| | | |
|---|---|---|
| AU | 2010315015 | 7/2014 |
| CA | 2779754 | 5/2011 |

(Continued)

OTHER PUBLICATIONS

Hirst, E. et al., "Determination of household energy data using 'fingerprints' from energy billing data" Intl. Journal of Energy Research vol. 10 No. 4 (1986) pp. 393-405.*

(Continued)

*Primary Examiner* — Kakali Chaki
*Assistant Examiner* — Brian M Smith
(74) *Attorney, Agent, or Firm* — Kraguljac Law Group, LLC (57) ABSTRACT

A residential home characteristics inferring method and system that receives information about energy usage by an energy user, determines using a processor and the received information about energy usage average daily usage during a heating season and average daily usage during a shoulder season, and identifies the fuel type used for heating by the energy user using the determined average daily usage during the heating season and the determined average daily usage during the shoulder season.

13 Claims, 8 Drawing Sheets

(56) References Cited

U.S. PATENT DOCUMENTS

| | | |
|---|---|---|
| 6,327,605 B2 | 12/2001 | Arakawa et al. |
| D462,077 S | 8/2002 | Greminger |
| 6,606,104 B1 | 8/2003 | Kondo et al. |
| 6,701,298 B1 | 3/2004 | Jutsen |
| 6,732,055 B2 | 5/2004 | Bagepalli et al. |
| 6,778,945 B2 | 8/2004 | Chassin et al. |
| 6,785,620 B2 | 8/2004 | Kishlock et al. |
| 6,972,660 B1 | 12/2005 | Montgomery, Jr. et al. |
| 7,020,508 B2 | 3/2006 | Stivoric et al. |
| 7,073,073 B1 | 7/2006 | Nonaka et al. |
| 7,073,075 B2 | 7/2006 | Freyman et al. |
| 7,136,710 B1 | 11/2006 | Hoffberg et al. |
| 7,142,949 B2 | 11/2006 | Brewster et al. |
| 7,149,727 B1 | 12/2006 | Nicholls et al. |
| 7,200,468 B2 | 4/2007 | Ruhnke et al. |
| 7,243,044 B2 | 7/2007 | McCalla |
| 7,333,880 B2 | 2/2008 | Brewster et al. |
| 7,356,548 B1 | 4/2008 | Culp et al. |
| 7,444,251 B2 | 10/2008 | Nikovski et al. |
| 7,460,502 B2 | 12/2008 | Arima et al. |
| 7,460,899 B2 | 12/2008 | Almen |
| 7,552,030 B2 | 6/2009 | Guralnik et al. |
| 7,561,977 B2 | 7/2009 | Horst et al. |
| D605,652 S | 12/2009 | Plaisted et al. |
| 7,878,890 B2 | 2/2011 | Toyohara et al. |
| 7,991,513 B2 | 8/2011 | Pitt |
| 8,065,098 B2 | 11/2011 | Gautam |
| 8,166,047 B1 | 4/2012 | Cohen et al. |
| D660,867 S | 5/2012 | Marchetti |
| 8,180,591 B2 | 5/2012 | Yuen et al. |
| D665,411 S | 8/2012 | Rai et al. |
| 8,239,178 B2 | 8/2012 | Gray et al. |
| D667,841 S | 9/2012 | Rai et al. |
| 8,260,468 B2 | 9/2012 | Ippolito et al. |
| 8,275,635 B2 | 9/2012 | Stivoric et al. |
| 8,280,536 B1 | 10/2012 | Fadell et al. |
| D671,550 S | 11/2012 | Chen et al. |
| 8,348,840 B2 | 1/2013 | Heit et al. |
| 8,375,118 B2 | 2/2013 | Hao et al. |
| 8,417,061 B2 | 4/2013 | Kennedy et al. |
| 8,428,785 B2 | 4/2013 | Boucher et al. |
| 8,429,630 B2 | 4/2013 | Nickolov et al. |
| 8,478,447 B2 | 7/2013 | Fadell et al. |
| 8,489,245 B2 | 7/2013 | Carrel et al. |
| D687,445 S | 8/2013 | Fuhrmann |
| D694,252 S | 11/2013 | Helm |
| 8,583,288 B1 | 11/2013 | Rossi et al. |
| D697,526 S | 1/2014 | Bruck et al. |
| 8,630,741 B1 | 1/2014 | Matsuoka et al. |
| 8,660,813 B2 | 2/2014 | Curtis et al. |
| D703,690 S | 4/2014 | MacCubbin et al. |
| 8,690,751 B2 | 4/2014 | Auphan |
| D707,245 S | 6/2014 | Bruck et al. |
| 8,751,432 B2 | 6/2014 | Berg-Sonne et al. |
| D710,871 S | 8/2014 | McCormack et al. |
| 8,805,000 B2 | 8/2014 | Derby et al. |
| 8,818,758 B1 | 8/2014 | Singh et al. |
| D714,335 S | 9/2014 | Cojuangco et al. |
| 8,868,248 B2 | 10/2014 | Park |
| D717,328 S | 11/2014 | Lin |
| D720,767 S | 1/2015 | Miller et al. |
| 8,954,849 B2 | 2/2015 | Doi et al. |
| D725,133 S | 3/2015 | Smirin et al. |
| D725,664 S | 3/2015 | Nies et al. |
| D729,268 S | 5/2015 | Nies et al. |
| D730,386 S | 5/2015 | Ryan et al. |
| 9,031,703 B2 | 5/2015 | Nakamura et al. |
| D731,538 S | 6/2015 | Lee |
| D732,049 S | 6/2015 | Amin |
| D732,062 S | 6/2015 | Kwon |
| D740,847 S | 10/2015 | Yampolskiy et al. |
| 2001/0047290 A1 | 11/2001 | Petras et al. |
| 2002/0065581 A1 | 5/2002 | Fasca |
| 2002/0178047 A1 | 11/2002 | Or et al. |
| 2002/0198629 A1 | 12/2002 | Ellis |
| 2003/0011486 A1 | 1/2003 | Ying |
| 2003/0018517 A1 | 1/2003 | Dull et al. |
| 2003/0023467 A1 | 1/2003 | Moldovan |
| 2003/0216971 A1 | 11/2003 | Sick et al. |
| 2004/0024717 A1 | 2/2004 | Sneeringer |
| 2004/0111410 A1 | 6/2004 | Burgoon et al. |
| 2004/0140908 A1 | 7/2004 | Gladwin et al. |
| 2005/0257540 A1 | 11/2005 | Choi et al. |
| 2006/0089851 A1 | 4/2006 | Silby et al. |
| 2006/0093222 A1 | 5/2006 | Saffer et al. |
| 2006/0103549 A1 | 5/2006 | Hunt et al. |
| 2006/0195438 A1 | 8/2006 | Galuten |
| 2006/0246968 A1 | 11/2006 | Dyke-Wells |
| 2007/0061735 A1 | 3/2007 | Hoffberg et al. |
| 2007/0185835 A1 | 8/2007 | Ursitti et al. |
| 2007/0198459 A1 | 8/2007 | Boone et al. |
| 2007/0203860 A1 | 8/2007 | Golden et al. |
| 2007/0213992 A1 | 9/2007 | Anderson et al. |
| 2007/0255457 A1 | 11/2007 | Whitcomb et al. |
| 2007/0260405 A1 | 11/2007 | McConnell et al. |
| 2008/0027885 A1 | 1/2008 | van Putten et al. |
| 2008/0033587 A1 | 2/2008 | Kurita et al. |
| 2008/0167535 A1 | 7/2008 | Stivoric et al. |
| 2008/0189632 A1 | 8/2008 | Tien et al. |
| 2008/0195561 A1 | 8/2008 | Herzig |
| 2008/0222561 A1 | 9/2008 | Helfman et al. |
| 2008/0244429 A1 | 10/2008 | Stading |
| 2008/0281473 A1 | 11/2008 | Pitt |
| 2008/0281763 A1 | 11/2008 | Yliniemi |
| 2008/0304112 A1 | 12/2008 | Matsuno |
| 2008/0306985 A1 | 12/2008 | Murray et al. |
| 2009/0106202 A1 | 4/2009 | Mizrahi |
| 2009/0106674 A1 | 4/2009 | Bray et al. |
| 2009/0204267 A1 | 8/2009 | Sustaeta et al. |
| 2009/0217175 A1 | 8/2009 | Bechtel et al. |
| 2009/0217179 A1 | 8/2009 | Mons et al. |
| 2009/0326726 A1 | 12/2009 | Ippolito et al. |
| 2010/0025483 A1 | 2/2010 | Hoeynck et al. |
| 2010/0076835 A1 | 3/2010 | Silverman |
| 2010/0082174 A1 | 4/2010 | Weaver |
| 2010/0099954 A1 | 4/2010 | Dickinson et al. |
| 2010/0106575 A1 | 4/2010 | Bixby et al. |
| 2010/0138363 A1 | 6/2010 | Batterberry et al. |
| 2010/0156665 A1 | 6/2010 | Krzyzanowski et al. |
| 2010/0179704 A1 | 7/2010 | Ozog |
| 2010/0180223 A1 | 7/2010 | Speier |
| 2010/0198713 A1 | 8/2010 | Forbes, Jr. et al. |
| 2010/0217452 A1 | 8/2010 | McCord et al. |
| 2010/0217549 A1 | 8/2010 | Galvin et al. |
| 2010/0217550 A1 | 8/2010 | Crabtree et al. |
| 2010/0217642 A1 | 8/2010 | Crubtree et al. |
| 2010/0217651 A1 | 8/2010 | Crabtree et al. |
| 2010/0232671 A1 | 9/2010 | Dam et al. |
| 2010/0241648 A1 | 9/2010 | Ito et al. |
| 2010/0286937 A1 | 11/2010 | Hedley et al. |
| 2010/0289643 A1 | 11/2010 | Trundle et al. |
| 2010/0324962 A1 | 12/2010 | Nesler et al. |
| 2010/0332373 A1 | 12/2010 | Crabtree et al. |
| 2011/0022429 A1 | 1/2011 | Yates et al. |
| 2011/0023045 A1 | 1/2011 | Yates et al. |
| 2011/0040666 A1 | 2/2011 | Crabtree et al. |
| 2011/0061014 A1 | 3/2011 | Frader-Thompson et al. |
| 2011/0063126 A1 | 3/2011 | Kennedy et al. |
| 2011/0106316 A1 | 5/2011 | Drew et al. |
| 2011/0106328 A1 | 5/2011 | Zhou et al. |
| 2011/0106471 A1 | 5/2011 | Curtis et al. |
| 2011/0153102 A1 | 6/2011 | Tyagi et al. |
| 2011/0178842 A1 | 7/2011 | Rane et al. |
| 2011/0178937 A1 | 7/2011 | Bowman |
| 2011/0205245 A1 | 8/2011 | Kennedy et al. |
| 2011/0231320 A1 | 9/2011 | Irving |
| 2011/0251730 A1 | 10/2011 | Pitt |
| 2011/0251807 A1 | 10/2011 | Rada et al. |
| 2011/0282505 A1 | 11/2011 | Tomita et al. |
| 2011/0313964 A1 | 12/2011 | Sanchey Loureda et al. |
| 2012/0036250 A1 | 2/2012 | Vaswani et al. |
| 2012/0053740 A1 | 3/2012 | Venkatakrishnan et al. |
| 2012/0066168 A1 | 3/2012 | Fadell et al. |
| 2012/0078417 A1 | 3/2012 | Connell, II et al. |

(56) References Cited

U.S. PATENT DOCUMENTS

| | | | |
|---|---|---|---|
| 2012/0084063 | A1 | 4/2012 | Drees et al. |
| 2012/0179692 | A1 | 7/2012 | Hsiao et al. |
| 2012/0215369 | A1 | 8/2012 | Desai et al. |
| 2012/0216123 | A1 | 8/2012 | Shklovskii et al. |
| 2012/0259678 | A1 | 10/2012 | Overturf et al. |
| 2012/0290230 | A1 | 11/2012 | Berges Gonzalez et al. |
| 2012/0310708 | A1 | 12/2012 | Curtis et al. |
| 2013/0060531 | A1 | 3/2013 | Burke et al. |
| 2013/0060720 | A1 | 3/2013 | Burke |
| 2013/0097177 | A1 | 4/2013 | Fan et al. |
| 2013/0097481 | A1 | 4/2013 | Kotler et al. |
| 2013/0173064 | A1 | 7/2013 | Fadell et al. |
| 2013/0253709 | A1 | 9/2013 | Renggli et al. |
| 2013/0261799 | A1 | 10/2013 | Kuhlmann et al. |
| 2013/0262040 | A1 | 10/2013 | Buckley |
| 2014/0006314 | A1 | 1/2014 | Yu et al. |
| 2014/0019319 | A1 | 1/2014 | Derby et al. |
| 2014/0074300 | A1 | 3/2014 | Shilts et al. |
| 2014/0107850 | A1 | 4/2014 | Curtis |
| 2014/0148706 | A1 | 5/2014 | Van Treeck et al. |
| 2014/0163746 | A1 | 6/2014 | Drew et al. |
| 2014/0207292 | A1 | 7/2014 | Ramagem et al. |
| 2014/0324240 | A1* | 10/2014 | Thottan .................. G01D 4/00 700/291 |
| 2014/0337107 | A1 | 11/2014 | Foster |
| 2015/0227522 | A1 | 8/2015 | O'Donnell et al. |
| 2015/0227846 | A1 | 8/2015 | Mercer et al. |
| 2015/0254246 | A1 | 9/2015 | Sheth et al. |
| 2015/0267935 | A1 | 9/2015 | Devenish et al. |
| 2015/0269664 | A1 | 9/2015 | Davidson |
| 2015/0300831 | A1 | 10/2015 | Sernicola |
| 2015/0310019 | A1 | 10/2015 | Royer et al. |
| 2015/0310463 | A1 | 10/2015 | Turfboer et al. |
| 2015/0310465 | A1 | 10/2015 | Chan et al. |
| 2015/0319119 | A1 | 11/2015 | Ryu et al. |
| 2015/0324819 | A1 | 11/2015 | Lin et al. |
| 2015/0326679 | A1 | 11/2015 | Lin et al. |

FOREIGN PATENT DOCUMENTS

| | | |
|---|---|---|
| CA | 2832211 | 11/2012 |
| DE | 3703387 | 8/1987 |
| DE | 102011077522 | 12/2012 |
| EP | 0003010 | 7/1979 |
| EP | 2705440 | 3/2014 |
| EP | 2496991 | 9/2014 |
| GB | 1525656 | 9/1978 |
| GB | 2238405 | 5/1991 |
| JP | 2000-270379 | 9/2000 |
| JP | 2004-233118 | 8/2004 |
| JP | 2006-119931 | 5/2006 |
| JP | 2007-133468 | 5/2007 |
| JP | 2011-027305 | 2/2011 |
| JP | 2012-080679 | 4/2012 |
| JP | 2012-080681 | 4/2012 |
| JP | 2013-020307 | 1/2013 |
| WO | WO 03/102865 | 12/2003 |
| WO | WO 03/104941 | 12/2003 |
| WO | WO 2008/101248 | 8/2008 |
| WO | WO 2009/085610 | 7/2009 |
| WO | WO 2011/057072 | 5/2011 |
| WO | WO 2012/112358 | 8/2012 |
| WO | WO 2012/154566 | 11/2012 |
| WO | WO 2014/004148 | 1/2014 |
| WO | WO 2014/182656 | 11/2014 |

OTHER PUBLICATIONS

Fels, M. et al., "Model selection guidelines for PRISM" Proc. of ACEEE 1994 Summer Study on Energy Efficiency in Buildings (1994) pp. 49-61.*

NYS Dept. of Public Service and the Evaluation Advisory Group, "New York State Evaluation Plan Guidance for EEPS Program Administrators" Aug. 2013 (82 pp.).*

Ayres, I. et al., "Evidence from two large field experiments that peer comparison feedback can reduce residential energy usage," National Bureau of Economic Research Working Paper 15386 (2009) 36 pp. (Year: 2009).*

International Search Report and Written Opinion for PCT Application No. PCT/US2015/038692, dated Sep. 24, 2015, 13 pages.

International Preliminary Report on Patentability for PCT Application No. PCT/US2010/055621, dated May 15, 2012, 8 pages.

International Search Report and Written Opinion for PCT Application No. PCT/US2010/055621, dated Dec. 23, 2010, 9 pages.

International Search Report and Written Opinion for PCT Application No. PCT/US2012/036539, dated Jul. 6, 2012, 8 pages.

International Preliminary Report on Patentability for PCT Application No. PCT/US2012/036539, dated Nov. 21, 2013, 7 pages.

International Search Report and Written Opinion for PCT Application No. PCT/US2013/046126, dated Aug. 22, 2013, 9 pages.

International Preliminary Report on Patentability for PCT Application No. PCT/US2013/046126, dated Jan. 8, 2015, 8 pages.

International Search Report for PCT Application No. PCT/US2014/036901, dated Aug. 28, 2014, 3 pages.

Patent Examination Report No. 1 for Australian Patent Application No. 2010315015, dated Dec. 17, 2013, 3 pages.

Extended European Search Report for European Patent Application No. 12782569.3, dated Nov. 27, 2014, 7 pages.

Aragon, Liz, "Black and White Emoticons," posted at Sweet Clip Art, posting date Apr. 29, 2012. © 2011 2015 Elizabeth J. Aragon, available at http://sweetclipart.com/blackandwhiteemoticons838>.

Author Unknown, "An Inconvenient Truth," Jan. 9, 2008, 2 pages, available at http://web.archive.org/web/2008019005509/http://www.climatecrisis.net/takeaction/carbonca/.

Author Unknown, "Calculate Your Impact," Jul. 28, 2008, 4 pages, available at http://web.archive.org/web/200807281614/http://green.yahoo.com/calculator/.

Author Unknown, "Carbon Footprint Calculator: What's My Carbon Footprint?" The Nature Conservancy, Jul. 8, 2008, 8 pages, available at http://web.archive.org/web/20080708193253/http://www.nature.org/intiatives/climatechange/calculator/2008.

Author Unknown, "CoolClimate Calculator," May, 19,2008, 15 pages, available at http://web.archive.orgi/web/20080519220643/bie.berkeley.edu/coolcale/calculations.html.

Author Unknown, "Lifecycle Climate Footprint Calculator," Berkeley Institute of the Environment, Nov. 23, 2007, 6 pages, available at http://web.archive.org/web/20071123115832/http://bie.berkeley.edu/calculator.

Author Unknown, "More than just a thermostat.," http://www.ecobee.com/, 4 pages, Jul. 16, 2013.

Author Unknown, "Popups Climate Change: Carbon Calculator—Greenhouse Gas and Carbon Dioxide Calculator Wed Pages," The Nature Conservancy, 5 pages, Feb. 29, 2008, available at http://web.archive.org/web/20080229072420/www.nature.org/popups/misc/art20625.html.

Bailey, Timothy, et al., "Fitting a Mixture Model by Expectation Maximization to Discover Motifs in Biopolymers," UCSD Technical Report CS94-351, Proceedings of the Second International Conf. on Intelligent Systems for Molecular Biology, 1994, 33 pages.

Blaine, Joel, "Seven Cities and a Utility Company Team Up to Deliver Energy Savings," posted at Dept. of Energy, posting date Aug. 1, 2011, available at http://energy.gov/articles/sevencitiesandutilitycompanyteamdeliverresidentialenergysavings>.

Chen, Hanfeng, et al., "Testing for a Finite Mixture Model With Two Components," Journal of the Royal Statistical Society, Series B, vol. 66, No. 1, 26 pages, 2004.

De Prensa, Boletine, "TXU Energy Budget Alerts Give Consumers Control of Electricity Costs," TXU Energy, http://www.txu.com/es/about/press, 2 pages, May 23, 2012.

Deb, Partha, "Finite Mixture Models," Hunter College and the Graduate Center, CUNY NBER, FMM Slides, 42 pages, Jul. 2008.

D'Urso, M., et al., "A Simple Strategy for Life Signs Detection Via an X-Band Experimental Set-Up," Progress in Electromagnectics Research C, vol. 9, pp. 119-129 (2009).

(56) References Cited

OTHER PUBLICATIONS

Eckmann, J.P., et al., "Ergodic theory of chaos and strange attractors," Reviews of Modern Physics, vol. 57, No. 3, Part I, pp. 617-656, Jul. 1985.

Espinoza, Marcelo, et al., "Short-Term Load Forecasting, Profile Identification, and Customer Segmentation: A Methodology Based on Periodic Time Series," IEEE Transactions on Power Systems, vol. 20, No. 3, pp. 1622-1630, Aug. 2005.

Fels, Margaret F., "PRISM: An Introduction," Elsevier Sequoia, Energy and Buildings, vol. 9, pp. 5-18, 1986.

Fels, Margaret F., et al., Seasonality of Non-heating Consumption and Its effect on PRISM Results, Elsevier Sequoia, Energy and Buildings, vol. 9, pp. 139-148, 1986.

Figueiredo, Vera, et al., "An Electric Energy Consumer Characterization Framework Based on Data Mining Techniques," IEEE Transactions on Power Systems, vol. 20, No. 2, pp. 596-602, May 2005.

Fitbit® Official Site, "Flex, One & Zip Wireless Activity & Sleep Trackers," http://www.fitbit.com/, 4 pages, Jul. 15, 2013.

Freepik, Surprised emoticon square face with open eyes and mouth, posted at Flat Icon, posting date not given. © 2013-2015 Graphic Resources SL, available at http://www.flaticon.com/freeicon/surprisedemoticonsquarefacewithopeneyesandmouth_42835>.

Friedman, Jerome, et al., "Regularization Paths for Generalized Linear Models via Coordinate Descent," Journal of Statistical Sotfware, vol. 33, Iss. 1, pp. 1-22, Jan. 2010.

Gelber, Bob, "This Is Not a Bill," posted at Not a Mystery, posting date Apr. 18, 2015, available at http;//notamystery.com/2015/04/18/not_worth_the_papeUts_printed_on/>.

Goldberg, Miriam L., et al., "Refraction of PRISM Results into Components of Saved Energy," Elsevier Sequoia, Energy and Buildings, vol. 9, pp. 169-180, 1986.

Jansen, R.C., "Maximum Likelihood in a Generalized Linear Finite Mixture Model by Using the EM Algorithm," Biometrics, vol. 49, pp. 227-231, Mar. 1993.

Jawbone, "Know yourself. Live better." https://jawbone.com/up/, 7 pages, Jul. 15, 2013.

Karsten, "Green nudge: The classic social comparison experiment by Opower," posted at iNudgeyou, posting date Nov. 28, 2012, available at http://inudgeyou.com/greennudgetheclassicsocialcomparisonexperimentbyopower/>.

Laskey, Alex, et al., "OPOWER," posted at ACM, posting date Jun. 2011, Copyright © 2015 by the ACM, available at http://xrds.acm.org/article.cfm?aid =1961687>.

Leisch, Friedrich, "FlexMix: A General Framework for Finite Mixture Models and Latent Class Regression in R," Journal of Statistical Software, http://www.istatsoft.org/, vol. 11 (8), pp. 1-18, Oct. 2004.

Liang, Jian, et al. "Load Signature Study—Part II: Disaggregation Framework, Simulation, and Applications," IEEE Transactions on Power Delivery, vol. 25, No. 2, pp. 561-569, Apr. 2010.

Liang, Jian, et al., "Load Signature Study—Part I: Basic Concept, Structure, and Methodology," IEEE Transactions on Power Delivery, vol. 25, No. 2, pp. 551-560, Apr. 2010.

Marshall, Jonathan, "PG&E Home Energy Reports Stimulate Big Customer Savings," posted at PG&E Currents, posting date May 14, 2014, © 2014 Pacific Gas and Electric Company, available at http://www.pgecurrents.com/2014/05/14/pgehomeenergyreports-stimulatebigcustomersavings/>.

Mint.com, "Budgets you'll actually stick to," Budgeting-Calculate and Categorize your spending, https://www.mint.com/how-it-works/budgeting/, 2 pages, Jul. 12, 21013.

Mint.com, "We're always on alert." Alerts for bills, fees & going over budget, https://www.mint.com/how-it-works/alerts/, 2 pages, Jul. 12, 2013.

Morabito, Kerri, "High User Campaign," posted at Kerri Morabito, posting date not given, © Kerri Morabito, 2015, available at <URL: http://www.kerrimorabito.com/high-user-campaign.html>.

Mori, Hiroyuki, "State-of-the-Art Overview on Data Mining in Power Systems," IEEE, pp. 33-37, 2006.

Muthen, Bengt, et al., Finite Mixture Modeling with Mixture Outcomes Using the EM Algorithm, Biometrics, vol. 55, pp. 463-469, Jun. 1999.

Nest, "The Learning Thermostat," http://www.nest.com/, 2 pages, Jul. 15, 2013.

Nike.com, "Nike + FuelBand. Tracks your all-day activity and helps you do more . . . ," http://www.nike.com/us/en_us/c/nikeplus-f..uelband, 7 pages, Jul. 15, 2013.

Rocheleau, Jake, "38 Amazingly Well-Designed Emoji Iconsets," posted at SpyreStudios, posting date Mar. 25, 2015, SpyreStudios © 2015, available at http://spyrestudios.com/38welldesignedemojiiconsets/>.

Rose, O. "Estimation of the Hurst Parameter of Long-Range Dependent Time Series," University of Wuirzburg, Institute of Computer Science, Research Report Series, Report No. 137, 15 pages, Feb. 1996.

Sawka, Michael N., et al., "Human Adaptations to Heat and Cold Stress," RTOMP-076, 16 pages, Oct. 2001.

Stephen, Bruce, et al. "Domestic Load Characterization Through Smart Meter Advance Stratification," IEEE Transactions on Smart Grid, Power Engineering Letter, vol. 3, No. 3, pp. 1571-1572, Sep. 2012.

Stoop, R., et al., "Calculation of Lyapunov exponents avoiding spurious elements," Physica D 50, pp. 89-94, May 1991.

Wang, Xiaozhe, et al. "Rule induction for forecasting method selection: meta-learning the characteristics of univariate time series," Faculty of information Technology, Department of Econometrics and Business Statistics, Monash University, pp. 1-34.

Wang, Xiaozhe, et al., "Characteristic-Based Clustering for Time Series Data," Data Mining and Knowledge Discovery, Springer Science & Business Media, LLC, vol. 13, pp. 335-364 (2006).

Wehrens, Ron, et al. "Self- and Super-organizing Maps in R: The kohonen Package," Journal of Statistical Software, vol. 21, Iss. 5, pp. 1-19, Oct. 2007.

Wikipedia, "Akaike information criterion," 6 pages, Aug. 17, 2012.

Wikipedia, "Mixture model," 10 pages, Oct. 7, 2012.

* cited by examiner

INFERRING RESIDENTIAL HOME CHARACTERISTICS BASED ON ENERGY DATA

BACKGROUND

Field

The present disclosure relates generally to energy conservation and more specifically to identifying information about an energy user's home, including the fuel type used for heating and whether or not the home has an air conditioner, based on energy data.

Description of the Related Art

When comparing an energy user's energy usage with that of other energy users, more accurate comparisons can be made when certain characteristics are known about the home in which the energy user resides, such as the fuel type used for heating (e.g., electricity, gas, heating oil, or a combination) and whether or not the home has an air conditioner. This is because heating and cooling usage is often a significant driver of energy use.

Information about an energy user's home may be obtained from a variety of sources, including utilities, third party parcel data providers, and the energy users themselves. However, when this information is not available for an energy user, the energy user's customer experience may be degraded because the comparison of the energy user's energy usage with other energy users may not be accurate and energy efficiency tips provided may not be relevant.

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit the scope of the disclosure. Throughout the drawings, reference numbers are reused to indicate correspondence between referenced elements.

DETAILED DESCRIPTION

Identifying information about a building associated with an energy user (e.g., the energy user's home) may be useful in making comparisons of the energy user's energy use with that of other energy users and providing relevant energy efficiency tips. Such information may include, for example, a heating fuel type (e.g., electricity, gas, heating oil, coal, or other heating fuel) used by one or more climate control systems (e.g., a heating-ventilation and air-conditioning (HVAC) system) in the building and whether or not the building has an air conditioner. For example, comparisons may be more relevant when the other energy users to whom the energy user is compared are selected based upon shared building characteristics such as the heating fuel type used or whether or not the building has an air conditioner. These energy usage comparisons may be provided to the energy users along with tips on how to save energy, in order to help the energy users understand their energy consumption and to promote more efficient energy usage and/or other conservation goals.

Resource usage comparisons between different energy users or of different buildings having different heat fuel types or resource usage comparisons between those that have air conditioners and those that do not having air conditioners are less useful because resource usage (e.g., energy usage) varies greatly based on these building characteristics. Ignoring these characteristics when making resource usage comparisons may therefore degrade the customer experience and reduce the effectiveness of programs encouraging customers to become more energy efficient.

In order to create more useful comparisons, information about characteristics of a building associated with an energy user may be obtained from one or more data sources, including the energy user, the utility, rate code (e.g., a rate code for electric heat users means that the energy user probably uses electricity for heating), parcel data, or inferences based on energy usage. This information about the characteristics of a building, obtained from the one or more data sources, may be stored as values for a particular site data element (e.g., fuel type used for heating or presence of an air conditioning system), and associated confidence levels may also be stored. According to an embodiment, the associated confidence levels may be received from the one or more data sources, or may be determined by the system based upon an actual or assumed reliability of the data source, or based on any other criteria. Alternatively, the associated confidence levels may be inputted by a user of the system.

For example, information about a fuel type used by a building's heating system may be received from multiple sources, including (1) the utility company, (2) the utility customer, and/or (3) a third party parcel data provider. The information provided by the utility company may indicate that the building's heating system uses natural gas, and the information from the utility company may have an associated confidence level of 95%, indicating that there is a 95% certainty that the information is correct and the building's heating system uses natural gas. The information provided by the utility customer may indicate that the building's heating system uses natural gas, and the information received from the utility customer may have an associated confidence level of 99%, indicating that there is a 99% certainty that the information is correct and the building's heating system uses natural gas. The information provided by the third party parcel data provider may indicate that the building's heating system uses natural gas (or, alternatively, may indicate a different fuel type that is inconsistent with the information received from other data sources), and the information received from the third party parcel data provider may have an associated confidence level of 60%, indicating that there is a 60% certainty that the information is correct and the building's heating system uses natural gas.

For each site data element (e.g., fuel type used for heating, presence of an air conditioning system, etc.), the system may store the data received from one or more data sources along with the associated confidence levels. In the scenario described above, according to an embodiment the following data records may be stored by the system:

| Site data element | Source | Value | Confidence |
|---|---|---|---|
| heating fuel | utility | natural gas | 95% |
| heating fuel | utility customer | natural gas | 99% |
| heating fuel | third party parcel data provider | natural gas | 60% |

The data records described above may be stored by the system in a database or in any other manner. The data records may be associated with a particular utility customer, building, and/or site. According to an embodiment, a plurality of records may be stored for a plurality of site data elements. According to another embodiment, confidence levels may be omitted from the data records.

According to an embodiment, other software modules may request data related to a particular site data element, and the system may be configurable to return the value with the highest confidence level, the value from a specific source, and/or the values (and their sources) that are above a specific confidence threshold.

For illustrative purposes, various embodiments described herein relate to residential energy users and the homes of the residential energy users. However, the embodiments may also be implemented with other types of energy users (e.g., utility customers, building managers, administrators, or monitoring systems) or building types (e.g., businesses, a set of structures, or other site).

Information about characteristics of a building associated with an energy user such as a fuel type used for heating may not be available from data sources such as the energy user, the utility, rate code, etc., or the confidence level (i.e., estimated level of accuracy) for the available information may not be as high as desired. Accordingly, inferring characteristics of a building associated with an energy user using resource usage information may be necessary or desirable.

A system according to an embodiment may infer characteristics of a building associated with an energy user, such as fuel type used for heating (e.g., electric or gas) or whether or not the building has an air conditioner. The system may determine these characteristics on an automated basis so that other software modules may utilize this information about home characteristics. Additionally, more relevant efficiency tips may be provided based on determined home characteristics. Optionally, according to an embodiment, the system may determine a confidence level associated with the inferred characteristics based upon an actual or assumed reliability of the inference, or based on any other criteria. Alternatively, the associated confidence level may be inputted by a user of the system.

According to an embodiment, the system may use energy or other resource usage information to make an inference about the fuel type used for heating. The determined fuel type used for heating may then be used to provide targeted energy efficiency tips to an energy user.

Figure 1:
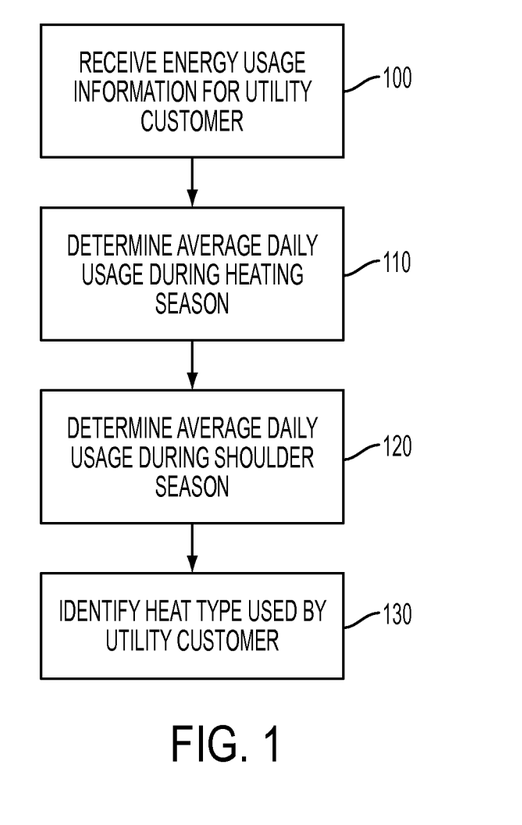
FIG. 1 is a flow diagram illustrating a process for identifying a fuel type used for heating by a building associated with an energy user, according to an embodiment.

FIG. 1 is a flow diagram illustrating a process for identifying a fuel type used for heating by an energy user, according to an embodiment.

In block 100, information is received about energy usage by an energy user (e.g., a utility customer, a homeowner, a tenant, a building manager, etc.). The energy usage information may be expressed as a quantity of electricity (e.g., a certain number of kilowatt-hours), a quantity of natural gas (e.g., a certain number of therms or cubic feet), or a quantity of any other resource (e.g., steam, hot water, heating oil, coal, etc.) supplied by a utility or resource provider. The energy usage information may be provided in various resolutions, including hourly, daily, monthly, or seasonal resolutions. The energy usage information may be provided by a utility, the energy user, or a third party.

In block 110, an average energy usage during a "heating season" is determined using the received energy usage information. According to the embodiment illustrated in FIG. 1, the average energy usage may be an average daily energy usage. In other embodiments, the average energy usage may correspond to other lengths of time. The heating season may correspond to the winter season, or it may correspond to any predetermined date range during which energy users typically use heating systems. The date range of the heating season may vary by geographic location and/or climate.

In block 120, an average energy usage during a "shoulder season" is determined using the received energy usage information. According to the embodiment illustrated in FIG. 1, the average energy usage may be an average daily energy usage. In other embodiments, the average energy usage may correspond to other lengths of time. The shoulder season may correspond to the spring and/or fall seasons, or it may correspond to any predetermined date range(s) during which use of heating systems and cooling systems is minimal or heating system use is at least reduced as compared to during the heating season. The date range(s) of the shoulder season may vary by geographic location and/or climate. Furthermore, the date range(s) may be temporally adjacent to the heating season.

In block 130, the information about the average daily energy usage during the heating season and the information about the average daily energy usage during the shoulder season are used to identify a fuel type used for heating, as described below with reference to FIG. 2.

Figure 2:
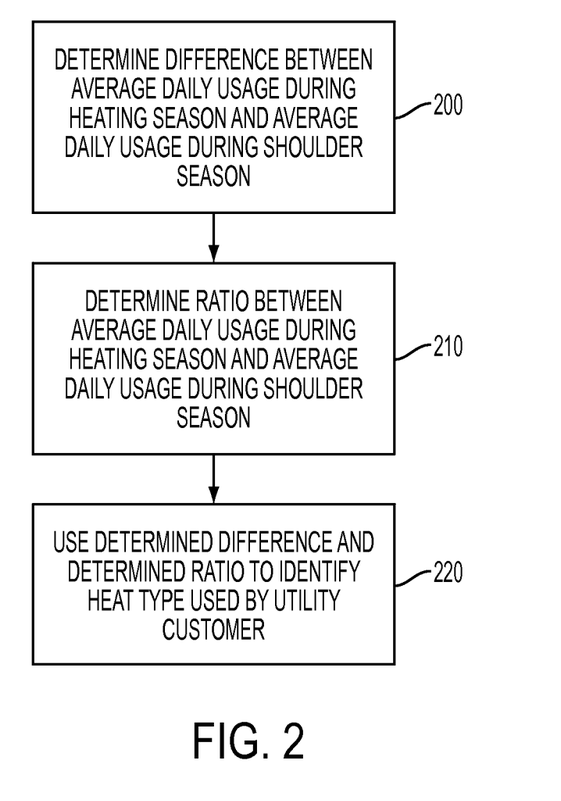
FIG. 2 is a flow diagram illustrating a process for using information about average daily energy usage during a heating season and information about average daily energy usage during a shoulder season to identify a fuel type used for heating by a building associated with an energy user, according to an embodiment.

FIG. 2 is a flow diagram illustrating a process for using information about average daily energy usage during a heating season and information about average daily energy usage during a shoulder season to identify a fuel type used for heating by a climate control system in the home of the energy user, according to an embodiment.

In block 200, a difference is determined between the determined average daily energy usage during the heating season and the average daily energy usage during the shoulder season. In block 210, a ratio is determined between the average daily energy usage during the heating season and the average daily energy usage during the shoulder season.

In block 220, the determined difference between the determined average daily energy usage during the heating season and the average daily energy usage during the shoulder season and the determined ratio between the determined average daily energy usage during the heating season and the average daily energy usage during the shoulder season is used to identify the fuel type used for heating by the energy user.

According to an embodiment, [formula 1] below may be used to impute a fuel type used for heating using electricity usage information. The [formula 1] is a linear discriminant function that is learned from a training data set. The training data set may be represented on a scatter plot and may include, for a plurality of electricity users having known fuel types for heating, the ratio $r_e$ (the determined ratio between the determined average daily electricity usage during the heating season and the average daily electricity usage during the shoulder season) and the difference $d_e$ (the determined difference between the determined average daily electricity usage during the heating season and the average daily electricity usage during the shoulder season). The linear discriminant function is a function that most accurately classifies the fuel types for heating for the plurality of electricity users in the training set based on each electricity user's ratio $r_e$ and difference $d_e$. The line across the scatter plot for the training data set in FIG. 3 (described below) represents the classification provided by the learned linear discriminant function (i.e., the linear discriminant function identifies electricity users having a ratio $r_e$ and difference $d_e$ plotted above the line as having an electric fuel type and those below the line as having an unknown fuel type for heating).

Figure 3:
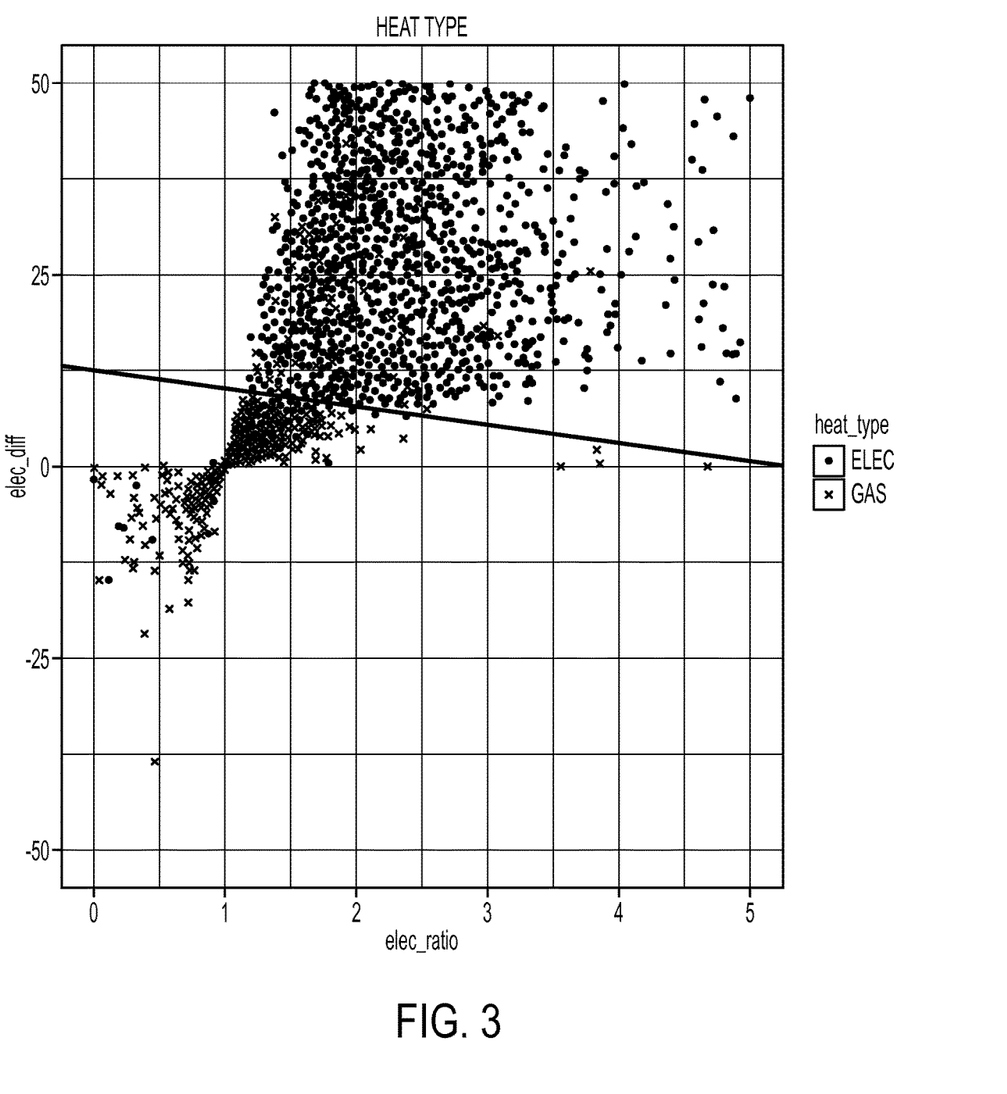
FIG. 3 is a scatter plot showing data points from a first example data set, according to an embodiment.

If $0.56*r_e+0.27*d_e-3.3>0$, then impute electric fuel type, otherwise fuel type unknown,  [formula 1]

where $r_e$=the determined ratio between the determined average daily electricity usage during the heating season and the average daily electricity usage during the shoulder season; and $d_e$=the determined difference between the determined average daily electricity usage during the heating season and the average daily electricity usage during the shoulder season (difference $d_e$ will be positive when heating season usage is greater than shoulder season usage, and negative when shoulder season usage is greater than heating season usage).

Although [formula 1] includes certain values for constants, other values, weights, or formulas may also be used. For example, linear discriminant analysis may be used to determine alternate constants, weights, or formulas using a training data set that includes resource usage data for customers with known heating fuel types.

FIG. 3 is a scatter plot showing data points from a first example data set, according to an embodiment. The first example data set includes information about electricity usage by a set of energy users. The set of energy users may include energy users from a particular utility company, energy users living in a particular geographic area, and/or having any other shared or similar characteristic(s). Alternatively, the set of energy users may be selected in any other manner.

The set of energy users includes energy users who have a climate control system that uses only electric fuel type for heating and energy users who have a climate control system that uses a gas fuel type or other non-electric fuel type for heating. Each data point plotted on the scatter plot shows the determined difference between the determined average daily electricity usage during the heating season and the average daily electricity usage during the shoulder season (elec_diff) and the determined ratio between the determined average daily electricity usage during the heating season and the average daily electricity usage during the shoulder season (elec_ratio) for a particular energy user in the set of energy users. Dots represent energy users who have an electric fuel type for heating, and x's represent energy users who have a gas fuel type or other non-electric fuel type for heating. (The dots and x's represent actual fuel types, rather than imputed/calculated fuel types.)

FIG. 3 includes a line running across the scatter plot. The line divides the scatter plot into an upper region in which [formula 1] will impute an electric fuel type for heating and a lower region in which [formula 1] will impute an unknown fuel type for heating. That is, according to [formula 1], for all of the energy users having data points above the line shown running across the scatter plot illustrated in FIG. 3, an electric fuel type for heating is imputed. For all of the energy users having data points shown below the line running across the scatter plot, the fuel type for heating is calculated to be unknown. In the first data set shown in FIG. 3, the fuel type for heating was identified with 90% accuracy using [formula 1].

According to an embodiment, instead of using [formula 1], a linear discriminator may be trained using multiple sample data sets that include information about energy usage and known fuel types for heating. Different discriminators may be used for different utilities and/or geographic areas, or the same discriminator may be used. The discriminator may be refined by taking into account temperature and other regional variables.

Figure 4:
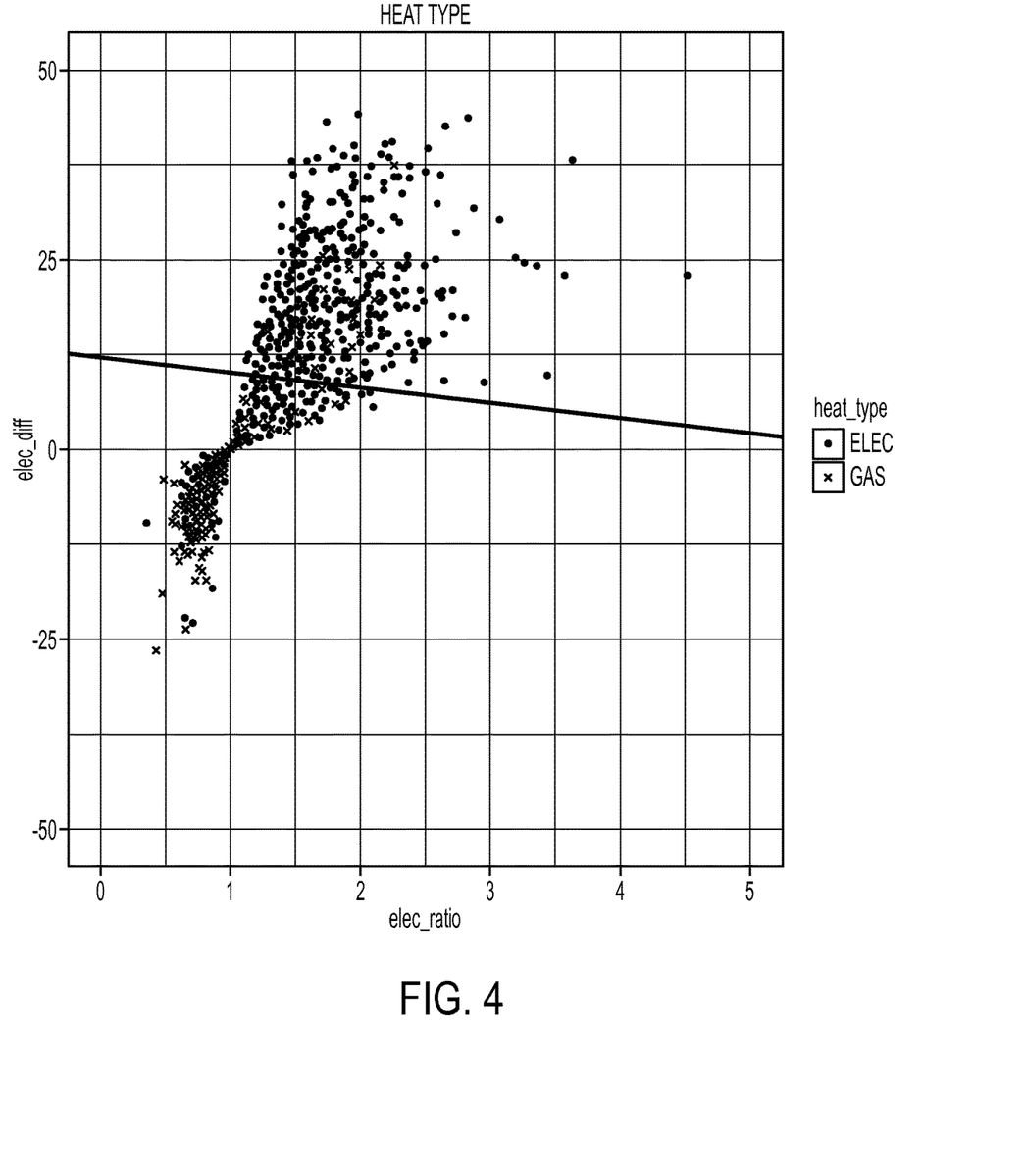
FIG. 4 is a scatter plot showing data points from a second example data set, according to an embodiment.

FIG. 4 is a scatter plot showing data points from a second example data set, according to an embodiment. The second example data set includes information about electricity usage by a set of energy users. The set of energy users may include energy users from a particular utility company, energy users living in a particular geographic area, and/or having any other shared or similar characteristic(s). Alternatively, the set of energy users may be selected in any other manner.

The set of energy users includes energy users who have a climate control system that uses electric fuel type for heating and energy users who have a climate control system that uses a non-electric (e.g., natural gas) fuel type for heating. Each data point plotted on the scatter plot shows the determined difference between the determined average daily electricity usage during the heating season and the average daily electricity usage during the shoulder season (elec_diff) and the determined ratio between the determined average daily electricity usage during the heating season and the average daily electricity usage during the shoulder season (elec_ratio) for a particular energy user in the set of energy users. Dots represent energy users who have an electric fuel type for heating, and x's represent energy users who have a non-electric (e.g., natural gas) fuel type for heating. (The dots and x's represent actual fuel types, rather than imputed/calculated fuel types.)

FIG. 4 includes a line running across the scatter plot. The line divides the scatter plot into an upper region in which [formula 1] will impute an electric fuel type for heating and a lower region in which [formula 1] will impute an unknown fuel type for heating. That is, according to [formula 1], for all of the energy users having data points above the line shown running across the scatter plot illustrated in FIG. 4, an electric fuel type for heating is imputed. For all of the energy users having data points shown below the line running across the scatter plot, the fuel type for heating is calculated to be unknown.

According to an embodiment, [formula 2] may be used to impute a fuel type used for heating using gas usage information. The [formula 2] is a linear discriminant function that is learned from a training data set. The training data set may be represented on a scatter plot and may include, for a plurality of gas users having known fuel types for heating, the ratio $r_g$ (the determined ratio between the determined average daily gas usage during the heating season and the average daily gas usage during the shoulder season) and the difference $d_g$ (the determined difference between the determined average daily gas usage during the heating season and the average daily gas usage during the shoulder season). The linear discriminant function is a function that most accurately classifies the fuel types for heating for the plurality of gas users in the training set based on each gas user's ratio $r_g$ and difference $d_g$. The line across the scatter plot for the training data set in FIG. 5 (described below) represents the classification provided by the learned linear discriminant function (i.e., the linear discriminant function identifies electricity users having a ratio $r_g$ and difference $d_g$ plotted above the line as having an electric fuel type and those below the line as having an unknown fuel type for heating).

Figure 5:
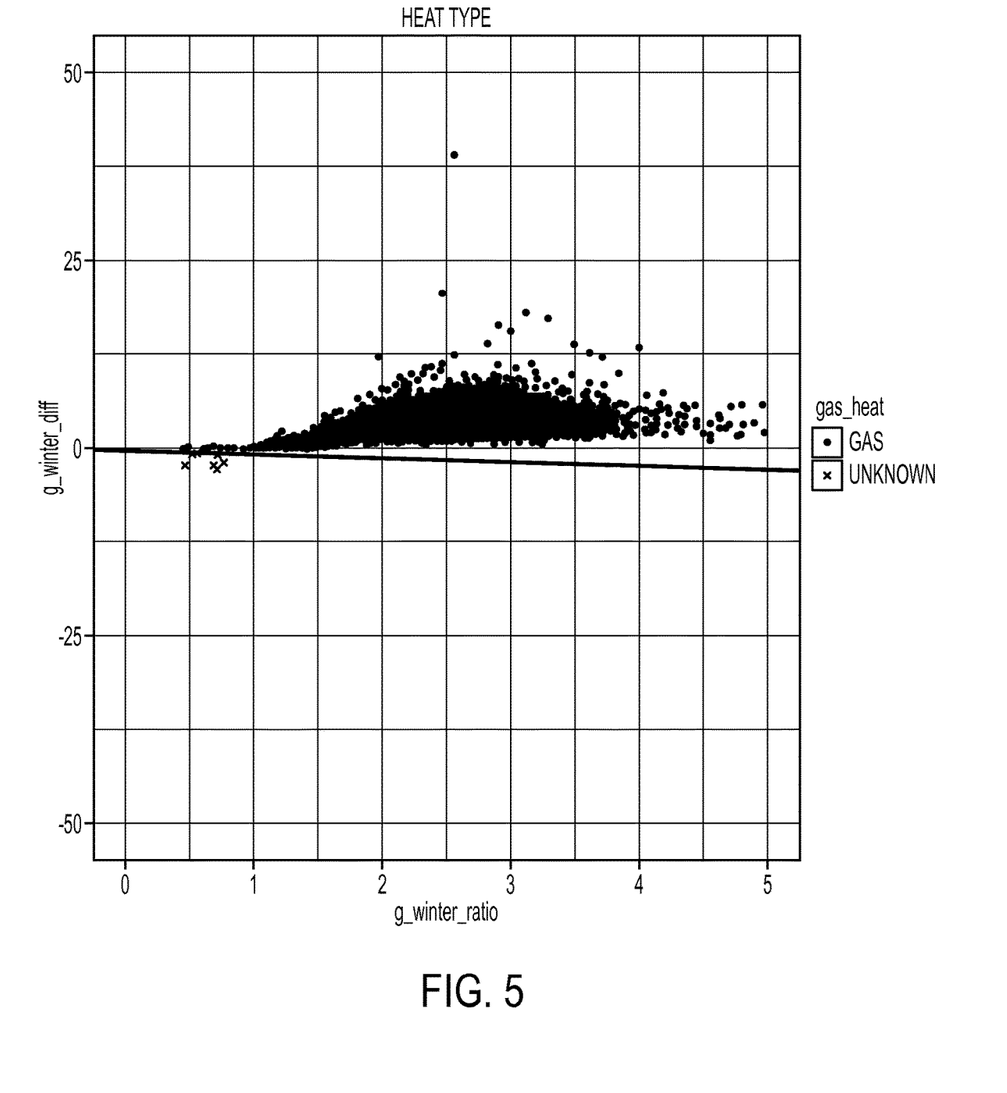
FIG. 5 is a scatter plot showing data points from a third example data set, according to an embodiment.

If $0.38*r_g+0.77*d_g+0.30>0$, then impute gas fuel type, otherwise fuel type unknown. [formula 2]

where $r_g$=the determined ratio between the determined average daily gas usage during the heating season and the average daily gas usage during the shoulder season; and $d_g$=the determined difference between the determined average daily gas usage during the heating season and the average daily gas usage during the shoulder season (difference $d_g$ will be positive when heating season usage is greater than shoulder season usage, and negative when shoulder season usage is greater than heating season usage).

Although [formula 2] includes certain values for constants, other values, weights, or formulas may also be used. For example, linear discriminant analysis may be used to determine alternate constants, weights, or formulas using a training data set that includes resource usage data for customers with known heating fuel types.

FIG. 5 is a scatter plot showing data points from a third example data set, according to an embodiment. The third example data set includes information about gas usage by a set of energy users. The set of energy users may include energy users from a particular utility company, energy users living in a particular geographic area, and/or having any other shared or similar characteristic(s). Alternatively, the set of energy users may be selected in any other manner.

The set of energy users includes energy users who have a climate control system that uses a gas fuel type for heating and energy users who have a climate control system that uses an unknown or non-gas fuel type for heating. Each data point plotted on the scatter plot shows the determined difference between the determined average daily gas usage during the heating season and the average daily gas usage during the shoulder season (g_winter_diff) and the determined ratio between the determined average daily gas usage during the heating season and the average daily gas usage during the shoulder season (g_winter_ratio) for a particular energy user in the set of energy users. Dots represent energy users who have a gas fuel type for heating, and x's represent energy users who have an unknown fuel type for heating. (The dots and x's represent actual fuel types, rather than imputed/calculated fuel types.)

According to [formula 2], for all of the energy users having data points above the line shown running across the scatter plot illustrated in FIG. 5, a gas fuel type for heating is imputed. For all of the energy users having data points shown below the line running across the scatter plot, the fuel type for heating is calculated to be unknown.

According to an embodiment, fuel type for heating may be imputed using [formula 1] and [formula 2] if both electricity usage information and gas usage information is available. If [formula 1] indicates that electric fuel is used for heating and [formula 2] indicates that gas fuel is used for heating, then an additional linear discriminant function [formula 3] learned from a training data set may be used to determine the fuel type used for heating. The [formula 3] is a function that most accurately classifies the fuel types used for heating for the plurality of users in the training set based on each user's ratios $r_e$ and $r_g$ and differences $d_e$ and $d_g$. For example:

If $0.56*r_e+0.27*d_e-3.3>0$, then set e_bool=true, otherwise e_bool=false;

If $0.38*r_g+0.77*d_g+0.30>0$, then set g_bool=true, otherwise g_bool=false;

If e_bool=false and g_bool=false, then fuel type for heating is unknown;

If e_bool=true and g_bool=false, then impute electric fuel type for heating;

If e_bool=false and g_bool=true, then impute gas fuel type for heating; and

If e_bool=true and g_bool=true, then if [formula 3]-$0.94*r_e-0.11*d_e+0.63*r_g+0.57*d_g+1.82>0$, then impute electric fuel type used for heating, otherwise impute gas fuel type used for heating.

Although the formulas above include certain values for constants, other values, weights, or formulas may also be used. For example, linear discriminant analysis may be used to determine alternate constants, weights, or formulas using a training data set that includes resource usage data for customers with known heating fuel types.

According to an alternative embodiment, other classification models may be used to infer a fuel type used for heating. These other classification models include supervised models that use features extracted from resource usage data and/or other building or site data and labeled data to train a series of models (e.g., logistic regression models or support vector machine models).

Additionally, unsupervised classification models may be used that cluster buildings into groups based on features extracted from resource usage data and/or other building or site data (e.g., k-means clustering models or self-organizing map models).

According to yet another embodiment, generalized ensemble models may be used to infer a fuel type for heating. The generalized ensemble models may apply more than one model and then determine best prediction for the fuel type used for heating.

According to another embodiment, in addition to or instead of inferring a home's fuel type for heating, a determination may be made as to whether or not the home has an air conditioner. In this embodiment, information is received about electricity usage, and an average energy usage during a "cooling season" is determined. The average energy usage for the cooling season may be an average daily energy usage. In other embodiments, the average energy usage may correspond to other lengths of time. The cooling season may correspond to the summer season, or it may correspond to any predetermined date range during which energy users typically use air conditioners. The date range of the cooling season may vary by geographic location and/or climate.

Additionally, an average energy usage during a "shoulder season" is determined using the received energy usage information. The average energy usage for the shoulder season may be an average daily energy usage. In other embodiments, the average energy usage may correspond to other lengths of time. The shoulder season may correspond to the spring and/or fall seasons, or it may correspond to any predetermined date range(s) during which use of heating systems and cooling systems is minimal or cooling system use is at least reduced as compared to during the cooling season. The date range(s) of the shoulder season may vary by geographic location and/or climate. Furthermore, the date range(s) of the shoulder season may be temporally adjacent to the cooling season.

According to this embodiment, if the difference between the average daily energy usage during the cooling season and the average daily energy usage during the shoulder season is greater than a predetermined amount determined based on daily usage data for similar homes with air conditioners, determined based on expected usage information for air conditioners, or determined on any other basis, then the presence of an air conditioner may be assumed. For example, a window air conditioning unit uses about 1 kW. Assuming that an energy user uses the air conditioning unit for 5 hours a day in the summer, a window air conditioning unit would be expected to increase average daily energy usage during the summer by about 5 kWh. Thus, according to an embodiment, the predetermined amount may 5 kWh/day.

According to another embodiment, energy users may be ranked by the size of their energy usage spikes during the heating season, and then the top X percent of energy users may be assumed to have a particular heat fuel type, where X is the percentage of the population in a geographic region that is known or expected to have that heat fuel type. For example, if 10% of the population in the geographic region is known or expected to use an electric fuel type for heating, the top 10% of electricity users during the heating season may be assumed to use an electric fuel type for heating. If 80% of the population in the geographic region is known or expected to use a natural gas fuel type for heating, the top 80% of natural gas users during the heating season may be assumed to use a natural gas fuel type for heating.

Likewise, energy users may be ranked by the size of their energy usage spikes during the cooling season, and then the top X percent of energy users may be assumed to have an air conditioner, where X is the percentage of the population in a geographic region that is known or expected to have an air conditioner.

Figure 6:
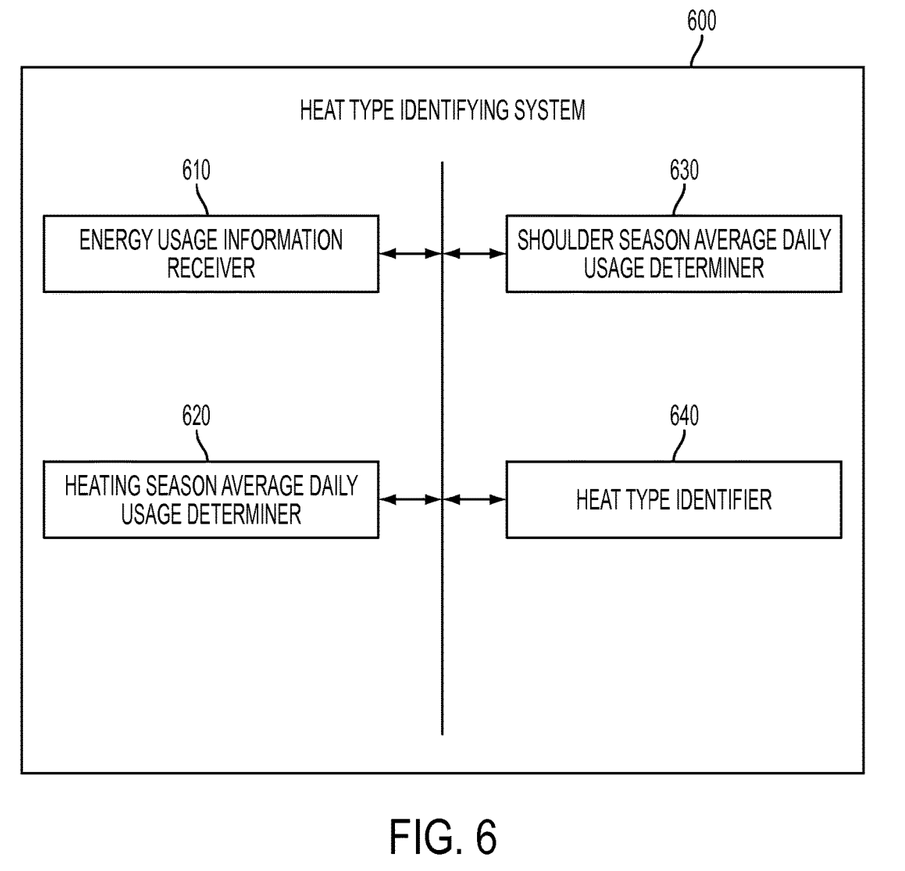
FIG. 6 is a block diagram illustrating a system for identifying a fuel type used for heating, according to an embodiment.

FIG. 6 is a block diagram that illustrates an embodiment of a system for identifying a fuel type used for heating 600 which includes an energy usage information receiver 610, a heating season average daily usage determiner 620, a shoulder season average daily usage determiner 630, and a heat fuel type identifier 640.

According to an embodiment, the energy usage information receiver 610 receives information about energy usage by an energy user. The heating season average daily usage determiner 620 uses a processor to determine the average daily energy usage during a heating season. The shoulder season average daily usage determiner 630 uses a processor to determine the average daily energy usage during a shoulder season. The heat fuel type identifier 640 uses the information about the heating season average daily energy usage and the shoulder season average daily energy usage to determine a fuel type for heating.

According to another embodiment, the heating season average daily usage determiner 620 may be replaced or supplemented with a cooling season average daily usage determiner (not shown) that uses a processor to determine the average daily energy usage during a cooling season. The shoulder season average daily usage determiner 630 uses a processor to determine the average daily energy usage during a shoulder season. The heat fuel type identifier 640 may be replaced or supplemented with an air conditioner usage determiner (not shown) that uses the information about the cooling season average daily energy usage and the shoulder season average daily energy usage to determine whether or not an air conditioner is used.

Figure 7:
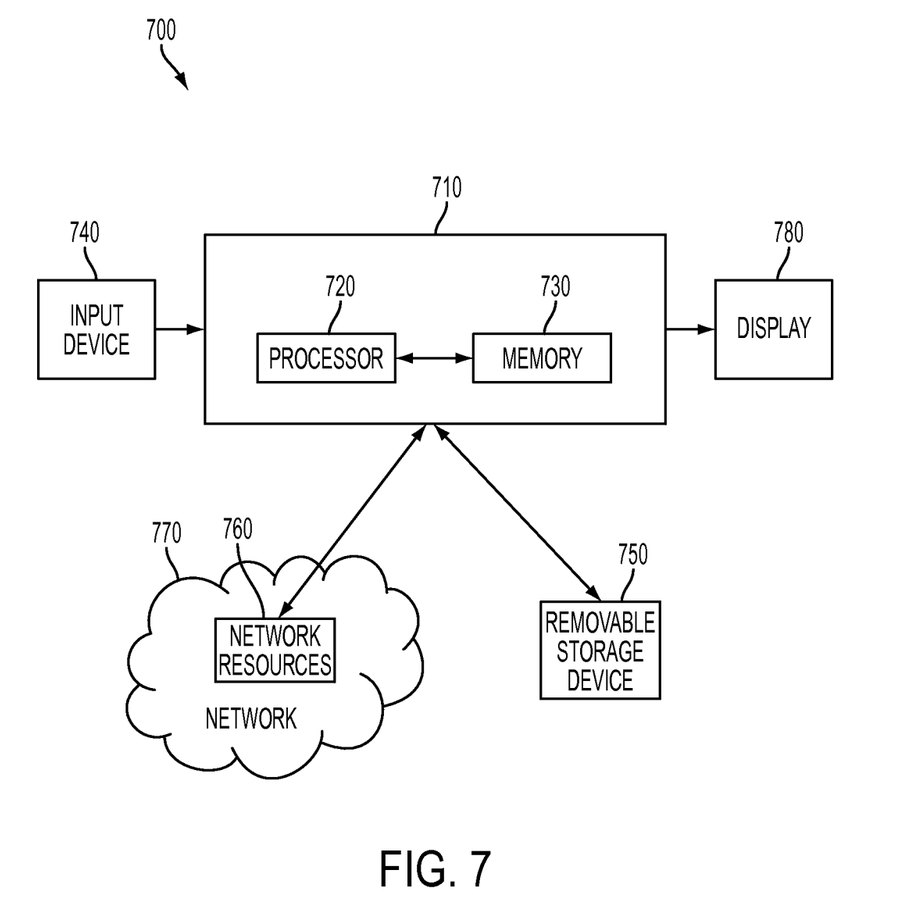
FIG. 7 is a block diagram illustrating a computer system upon which the system for identifying a fuel type used for heating may be implemented, according to an embodiment.

FIG. 7 is a block diagram that illustrates an embodiment of a computer/server system 700 upon which an embodiment may be implemented. The system 700 includes a computer/server platform 710 including a processor 720 and memory 730 which operate to execute instructions, as known to one of skill in the art. The term "computer-readable storage medium" as used herein refers to any tangible medium, such as a disk or semiconductor memory, that participates in providing instructions to processor 720 for execution. Additionally, the computer platform 710 receives input from a plurality of input devices 740, such as a keyboard, mouse, touch device, touchscreen, or microphone. The computer platform 710 may additionally be connected to a removable storage device 750, such as a portable hard drive, optical media (CD or DVD), disk media, or any other tangible medium from which a computer can read executable code. The computer platform 710 may further be connected to network resources 760 which connect to the Internet or other components of a local public or private network. The network resources 760 may provide instructions and data to the computer platform 710 from a remote location on a network 770. The connections to the network resources 760 may be via wireless protocols, such as the 802.11 standards, Bluetooth® or cellular protocols, or via physical transmission media, such as cables or fiber optics. The network resources may include storage devices for storing data and executable instructions at a location separate from the computer platform 710. The computer platform 710 interacts with a display 780 to output data and other information to a utility customer, tenant, or other user, as well as to request additional instructions and input from the utility customer, tenant, or other user. The display 780 may be a touchscreen display and may act as an input device 740 for interacting with a utility customer, tenant, or other user.

Figure 8:
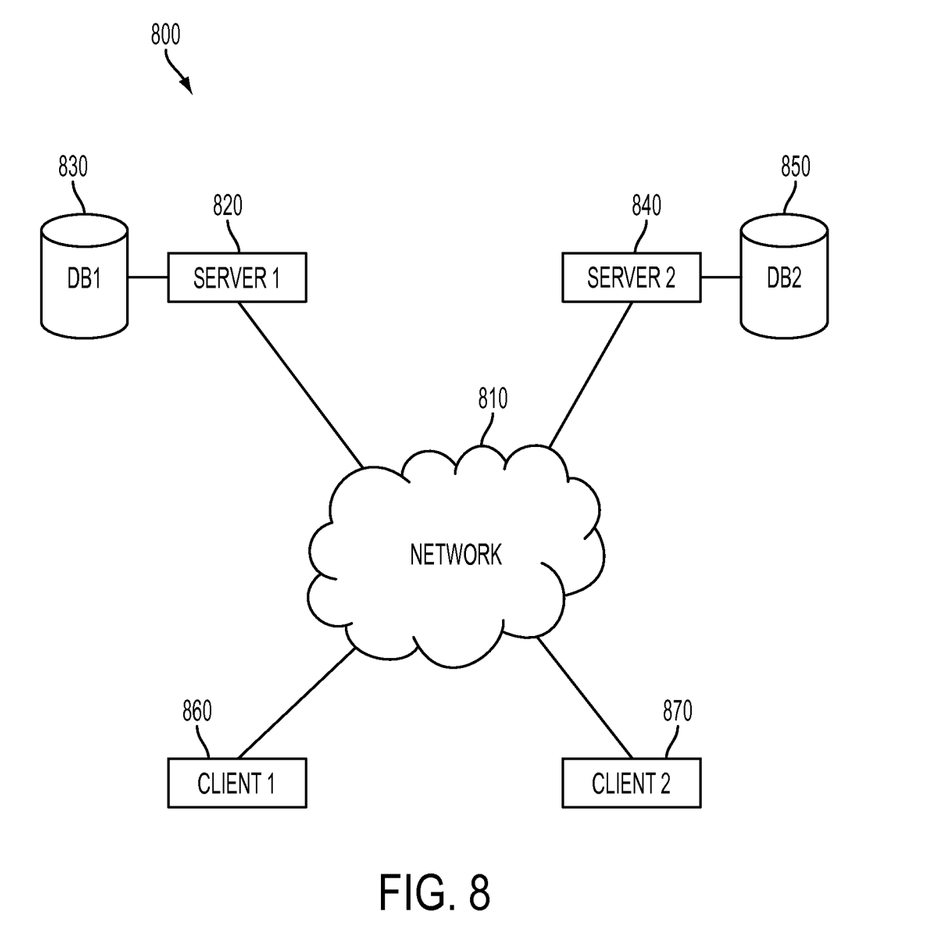
FIG. 8 is a block diagram that illustrates an embodiment of a network including servers upon which the system may be implemented and client machines that communicate with the servers.

FIG. 8 is a block diagram that illustrates an embodiment of a network 800 including servers 820, 840 upon which the system may be implemented and client machines 860, 870 that communicate with the servers 820, 840. The client machines 820, 840 communicate across the Internet or another wide area network (WAN) or local area network (LAN) 810 with server 1 820 and server 2 840. Server 1 820 communicates with database 1 830, and server 2 840 communicates with database 2 850. According to an embodiment, one or both of server 1 820 and server 2 840 may implement a system for identifying residential home characteristics. Client 1 860 and/or client 2 870 may interface with the system and request server 1 820 and/or server 2 840 to perform processing to identify residential home characteristics. Server 1 820 may communicate with or otherwise receive information from database 1 830 or another internal or external data source or database in the process of identifying residential home characteristics at the request of a client, and server 2 840 may communicate with database 2 850 or another internal or external data source or data base in the process of identifying residential home characteristics at the request of a client.

According to an embodiment, this information may be used to generate comparisons and/or efficiency tips provided in the form of paper reports (either included with utility bills or as separate mailings), e-mails, text messages, web site content, or in other forms. According to another embodiment, an application programming interface may be provided, and a utility may pull the data and include it on customers' bills and/or use the data for other purposes. The data may also be utilized by an application developed by a utility or utility partner.

The foregoing detailed description has set forth various embodiments via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, or virtually any combination thereof, including software running on a general purpose computer or in the form of a specialized hardware.

While certain embodiments have been described, these embodiments have been presented by way of example only, and are not intended to limit the scope of the protection. Indeed, the novel methods and apparatuses described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection.

What is claimed is:

1. A method for controlling transmission of energy efficiency tips based on a fuel type identified as being used for heating by a plurality of energy users and promoting energy efficiency, the method comprising:
   receiving energy usage information from at least one energy usage data source, the energy usage information comprising a quantity of energy supplied by a utility to each of the energy users;
   generating, using a processor and the energy usage information received, for each of the energy users, a data structure populated with content comprising:
      (i) average usage during a heating season and average usage during a shoulder season;
      (ii) a difference between the average usage during the heating season and the average usage during the shoulder season; and
      (iii) a ratio between the average usage during the heating season and the average usage during the shoulder season;
   identifying, for each of the plurality of energy users for whom the fuel type used for heating is unavailable to be retrieved from the at least one energy usage data source, the fuel type used for heating from a plurality of fuel types, wherein the fuel type is identified using a learned linear discrimination function that is a function of the generated difference and the generated ratio from the content of the data structure;
   controlling classification of the energy users into sets of compatible users corresponding to the plurality of fuel types identified for the energy users using the learned linear discrimination function, wherein the classification generates a first set of comparable energy users, and each of the comparable energy users classified in the first set uses a first fuel type from the plurality of fuel types;
   conducting a comparison of the energy usage by at least one of the comparable energy users in the first set to energy usage by other comparable energy users in the first set to provide the at least one of the comparable energy users in the first set with a comparison result that is relevant to usage of the first fuel type for heating;
   generating a targeted energy efficiency tip for the at least one of the comparable energy users that is relevant to the first fuel type, wherein the targeted energy efficiency tip is based, at least in part, on the comparison;
   based on the classification of the at least one of the compatible users in the first set, controlling transmission of an electronic message including the targeted energy efficiency tip and the comparison over a communication network to a remote device associated with the at least one of the comparable energy users for changing a setting of heating systems associated with the at least one of the comparable energy users; and
   generating, by a printer and based on the classification of at least a second compatible user in the first set, a paper report comprising a comparison of energy usage by the second compatible user to the energy usage by other comparable energy users included in the first set.

2. The method of claim 1, wherein receiving the energy usage information comprises receiving information about at least one of electricity usage or gas usage by the energy users.

3. The method of claim 1, wherein identifying the fuel type used for heating by the energy users further comprises, for each of the energy users:
   determining a level of confidence in the fuel type used for heating identified using the determined difference and the determined ratio;
   receiving information on the fuel type used for heating from at least one of the energy user, the utility, a third party, or rate plan information received from the utility;
   determining a level of confidence in the received information on the fuel type used for heating; and
   identifying the fuel type used for heating using the level of confidence in the identified fuel type and the level of confidence in the received information on the fuel type.

4. The method of claim 1, wherein identifying the fuel type used for heating further comprises, for each of the energy users, determining a confidence level regarding the identified fuel type used for heating.

5. The method of claim 1, wherein:
   the average usage during the heating season comprises information about average daily usage during the heating season; and
   the average usage during the shoulder season comprises information about average daily usage during the shoulder season.

6. A non-transitory computer readable medium storing instructions that, when executed by a processor of a computing device, cause the computing device to:
   receive average energy usage information for a heating season from at least one energy usage data source, the average energy usage information for the heating season comprising an average quantity of energy used by energy users during the heating season;
   receive average energy usage information for a shoulder season from the at least one energy usage data source, the average energy usage information for the shoulder season comprising an average quantity of energy used by the energy users during the shoulder season;
   generate, for each of the energy users, a data structure populated with content comprising:

(i) a difference between the average quantity of energy used during the heating season and the average quantity of energy used during the shoulder season; and (ii) a ratio between the average quantity of energy used during the heating season and the average quantity of energy used during the shoulder season;

identify, for each of the plurality of energy users for whom a fuel type used for heating is unavailable to be retrieved from the at least one energy usage data source, a fuel type used for heating from a plurality of fuel types, wherein the fuel type is identified using a learned linear discriminant function that is a function of the generated difference and the generated ratio from the content of the data structure;

control classification of the energy users into sets of compatible users corresponding to the plurality of fuel types identified for the energy users using the learned linear discrimination function, wherein the classification generates a first set of comparable energy users, and each of the comparable energy users classified in the first set uses a first fuel type from the plurality of fuel types;

conduct a comparison of energy usage by at least one of the comparable energy users in the first set to energy usage by other comparable energy users in the first set to provide the at least one of the comparable energy users in the first set with a comparison result that is relevant to usage of the first fuel type for heating;

generate a targeted energy efficiency tip for the at least one of the comparable energy users that is relevant to the first fuel type, wherein the targeted energy efficiency tip is based, at least in part, on the comparison; and based on the set of comparable users, control transmission of electronic messages including the targeted energy efficiency tip and the comparison over a communication network to a remote device associated with the at least one of the comparable energy users for changing a setting of heating systems associated with the at least one of the comparable energy users.

7. The non-transitory computer readable medium of claim 6, further comprising instructions that, when executed, cause the computing device to receive information about at least one of electricity usage or gas usage as the average energy usage information.

8. The non-transitory computer readable medium of claim 6 further comprising instructions that, when executed, cause the computing device to, for each of the energy users:

determine a level of confidence in the fuel type used for heating identified using the received average energy usage during the heating season and the received average energy usage during the shoulder season;

receive information on the fuel type used for heating from at least one of the energy user, the utility, a third party, or rate plan information received from the utility;

determine a level of confidence in the received information on the fuel type used for heating; and identify the fuel type used for heating using the level of confidence in the identified fuel type and the level of confidence in the received information on the fuel type.

9. The non-transitory computer readable medium of claim 6 further comprising instructions that, when executed, cause the computing device to determine a confidence level regarding the identified fuel type used for heating.

10. A system for controlling transmission of energy efficiency tips based on a fuel type identified as being used for heating by energy users and promoting energy efficiency, the system comprising:

a network receiver that receives information about energy usage by each of the energy users from a network resource over a network; and a processor that uses the information about energy usage received by the network receiver to generate, for each energy user:

(i) an average daily usage during a heating season,
(ii) an average daily usage during a shoulder season,
(iii) a difference between the average daily usage during the heating season and the average daily usage during the shoulder season, and
(iv) a ratio between the average daily usage during the heating season and the average daily usage during the shoulder season;

wherein the processor further:

identifies, for each of the plurality of energy users for whom the fuel type used for heating is unavailable to be retrieved from the at least one energy usage data source, the fuel type used for heating from a plurality of fuel types, wherein the fuel type is identified using a learned linear discriminant function that is a function of the generated difference and the generated ratio, controlling classification of the energy users into sets of compatible users corresponding to the plurality of fuel types identified for the energy users using the learned linear discrimination function, wherein the classification generates a first set of comparable energy users, and each of the comparable energy users classified in the first set uses a first fuel type from the plurality of fuel types, conducts a comparison of the energy usage by at least one of the comparable energy users in the first set to energy usage by other comparable energy users in the first set to provide the at least one of the comparable energy users in the first set with a comparison result that is relevant to usage of the first fuel type for heating, generates a targeted energy efficiency tip for the at least one of the comparable energy users that is relevant to the first fuel type, wherein the targeted energy efficiency tip is based, at least in part, on the comparison; and based on the classification of the at least one of the compatible users in the first set, controls transmission of an electronic message including the targeted energy efficiency tip and the comparison over a communication network to a remote device associated with the at least one of the comparable energy users for changing a setting of heating systems associated with the at least one of the comparable energy users.

11. The system of claim 10, wherein the network receiver receives information about at least one of electricity usage or gas usage as the average daily usage.

12. The system of claim 10, wherein the processor, in identifying the fuel type used for heating, uses at least one of rate plan information received from a utility, or a specified fuel type obtained from at least one of: (i) the energy users, (ii) the utility, and (iii) a third party.

13. The system of claim 10, wherein the processor, in identifying the fuel type used for heating, determines a confidence level regarding the identified fuel type used for heating.

* * * * *